Oct. 22, 1968 H. G. BRZOSKA 3,407,269

SYSTEM FOR AUTOMATICALLY SEQUENTIALLY SIGNALING PLURAL DIFFERENT ALARM MESSAGES TO DIFFERENT TELEPHONE SUBSCRIBERS

Filed Oct. 22, 1965 3 Sheets-Sheet 1

INVENTOR.
HENRY G. BRZOSKA
BY Kenneth E. Merklen
Attorney

Oct. 22, 1968 H. G. BRZOSKA 3,407,269

SYSTEM FOR AUTOMATICALLY SEQUENTIALLY SIGNALING PLURAL DIFFERENT ALARM MESSAGES TO DIFFERENT TELEPHONE SUBSCRIBERS

Filed Oct. 22, 1965

3 Sheets-Sheet 2

INVENTOR.
HENRY G BRZOSKA
BY Kenneth E. Merklen
Attorney

INVENTOR.
HENRY G. BRZOSKA
BY Kenneth E. Merklen
Attorney 3,407,269

SYSTEM FOR AUTOMATICALLY SEQUENTIALLY SIGNALING PLURAL DIFFERENT ALARM MESSAGES TO DIFFERENT TELEPHONE SUBSCRIBERS

Henry G. Brzoska, Stamford, Conn., assignor to Sensor Corporation, a corporation of Connecticut
Filed Oct. 22, 1965, Ser. No. 500,804
6 Claims. (Cl. 179—5)

ABSTRACT OF THE DISCLOSURE

A system for automatically communicating a selected pre-recorded message to a selected pre-determined telephone, using the normal house-telephone lines, in response to occurrence of a pre-determined event. Provision is made to remember the occurrence of a second (different) pre-determined event which occurs after the first event and essentially during the process of communicating a first message and for proceeding with the process of communicating a second pre-recorded message to a second pre-determined telephone after the first selected pre-recorded message has been received. Provision is also made to repeat dialing the same telephone number if the dialed number is not answered. The dialing process is repeated until the pre-recorded message is communicated to the person answering the telephone so dialed.

The present invention relates to automatic alarm and message transmitting systems. In particular, the present invention is a novel alarm and message communicating system that may be connected into an existing telephone line, in parallel with one or more telephones on a home telephone circuit, for example.

In general, the novel automatic alarm and message transmitting system includes a telephone line-use detector which is an active component and may serve one or more alarm units in a complex alarm message system. Each alarm message system includes a sequence controller; an actuator or detector (which may be in the form of a fire or heat detector, burglar detector or other detector or switch) which serves to detect a predeterminable condition or occurrence; an automatic telephone dial apparatus; a reset timer; a message transmitter and a manual reset. In a complex system, in which two or more alarm/message units may be coupled for use with the same line-use detector, an interlock between the individual alarm/message units is provided.

The telephone line-use detector is referred to as an active component in the system, since the line-use detector essentially continually monitors the telephone line to which the alarm system is connected and provides information in the form of signals as to the state or condition of use of the telephone.

If the present automatic alarm and message transmitting system were placed in a home, for example, the telephone line-use detector may be connected across the telephone line between the telephone fuse box or local terminal and the telephone instrument, itself. The line-use detector may be in the form of a voltage level detector or threshold circuit which provides a signal in the form of a predetermined potential to the sequence controller and releases or permits the sequence controller to start a cycle of operation only when the telephone coupled to the line which is being monitored, is not otherwise in use.

The sequence controller may be a cyclic control component and may be provided in any of several forms. As will be described below, the preferred form of construction is a relay sequence form. However, a sequence controller in solid state form, such as transistors, diodes, magnetic amplifiers and/or other solid state components which may duplicate the functional operations or logic of a relay form sequence controller are included in the concept of this invention.

The advance of the art is such that solid state components and/or circuitry may be employed as functional equivalents for relay controlled contact closures and openings. Certain of the circuitry described below is in solid state form, while other of the circuitry is in relay function form. The substitution of solid state components and circuitry for providing the functions obtained from the disclosed relay circuitry is believed to be a matter of design since such substitution is well known to those skilled in the art.

The present invention has wide application as an alarm/message communication system. The actuatable detector or sensor may be in the form of a fire or heat detector which may serve for detecting the presence of an unfriendly or hostile fire in a structure. The actuatable detector may be in the form of a device which may detect unauthorized entrance of a person, such as a burglar. Another actuatable detector may be a temperature sensitive device which may be used to detect loss of heat which may be caused by a malfunction of a heating system in a building, in which it may be desired to maintain at least above a predetermined temperature, or may be a switch which may be manually operated by a person in need of help, such as medical assistance. Obviously, the dialing function of the alarm/message system may be pre-set to dial any telephone number desired. The dial function of the device may take any one of several forms. The drawings below illustrate a rotated printed circuit board while a tape form or card form automatic dial may be employed. The message sent may be put on a magnetic tape or other record play-back apparatus. The tape of a magnetic tape recorder or disc of a record play-back device may be pre-recorded with the message desired to be transmitted.

In order to reduce the bulk of the apparatus the preferred form of the invention includes a tape recorder in which the tape is pre-recorded with a desired message. In a fire alarm/message system, the message may include a declaration to the fire department that there is a fire, a request for help, the address origin of the message and that the message comes from an automatic fire alarm/message system, for example. Provision is also made for an audible alarm which may be sounded to warn people who may be in the building protected by the alarm/message system. In the case of a burglar alarm/message system any of several different type actuatable detectors may be employed. One type may be a photo-electric system detector which may be actuated when a light beam between a light source and a photo-electric cell is broken. The message provided on the pre-recorded transmitting device, for example, may inform the police or other law enforcement agency that the protection system has been actuated and a robbery or burglary may be in process at the address pre-recorded on the message sending device. In the case of a burglar alarm/message system the dial functioning component of the system may dial the telephone number of the local police or other law enforcement agency. An audible alarm may be associated with this latter type system if desired, however, the absence of an audible alarm provides a silent alarm/message transmitting system, as will be seen from the description below and may have advantages.

Other uses of the present alarm/message system may be found in the automatic call for medical assistance where a manually actuable switch may start operation of the system so as to effectuate a telephone call to a doctor or hospital. A message requesting medical assistance may be pre-recorded on the message transmitting means. Another use will be found in essentially monitoring the temperature in a structure, such as a home or other building in which it is desirable to maintain the internal ambient at least at some predetermined temperature. For example, in cold weather, it may be desirable to maintain the temperature of a home or other enclosed building substantially above freezing in order to protect water and/or other pipes. The present invention finds great utility in this instance where a malfunction or insufficiency of a heating system may be detected when the internal temperature falls to a predetermined low temperature, such as may be caused by such malfunction of the heating system. A telephone call may be made automatically to a repairman or other service person and a prerecorded message may be communicated to such person over the telephone, who may then take remedial action.

Other uses of the present automatic alarm/message transmitting system may be made as will be obvious from the very use and function of the present invention and such wide range of use is included within the scope of the present invention.

In order to effectively communicate the desired message to the person, agency, or organization to which such message is intended to reach, a timing reset component is included in the alarm/message system. It may be that the person or party to be reached is not at the phone then called or that the phone is busy. Should these conditions occur a message communicating telephone connection will not be made and a timing mechanism is employed to effect a partial re-cycle the alarm/message system after the desired phone number is dialed and the telephone so called is not answered within a predetermined time period. Under such conditions the timing component effectively causes a partial re-cycling or reset of the alarm/message system, so that the telephone connection is broken, subsequently reestablished, and the telephone number is redialed. The partial recycling may reoccur so that the telephone number is redialed until the telephone at the number so dialed, is answered, after which the prerecorded message is communicated to the party on the answering end of the phone connection over the telephone lines.

It is therefore, an object of the present invention to provide an actuable automatic alarm and message transmitting system which is connectable to an existing telephone system.

Another object is to provide an actuable alarm/message transmission system which may be actuated by occurrence of a predetermined act or condition, dial a predetermined telephone number and communicate a predetermined message, after the number so dialed answered, over an existing telephone system.

Another object is to provide an automatic alarm/message system which monitors a telephone line to which the system is connected and when the telephone line is not in use permits an actuated detector to initiate operation of the alarm/message system so that a prerecorded message may be communicated over the telephone system to which the alarm/message system is connected.

Another object is to provide an actuable automatic alarm/message transmitting system which upon actuation automatically dials a pre-determined telephone number when the telephone line is not otherwise in use.

A further object is to provide an actuable automatic alarm and message transmitting system which responds to the occurrence of a pre-determined event and dials a predetermined telephone number when the telephone line is not otherwise in use and also includes a resetting component for disconnecting, re-establishing connection and redialing the pre-determined telephone number in the event that a communicable connection is not attained within a pre-determined period.

These and other objects will become apparent from reading the following detailed description of a preferred form of the present invention in conjunction with the accompanying drawings in which.

Figure 1:
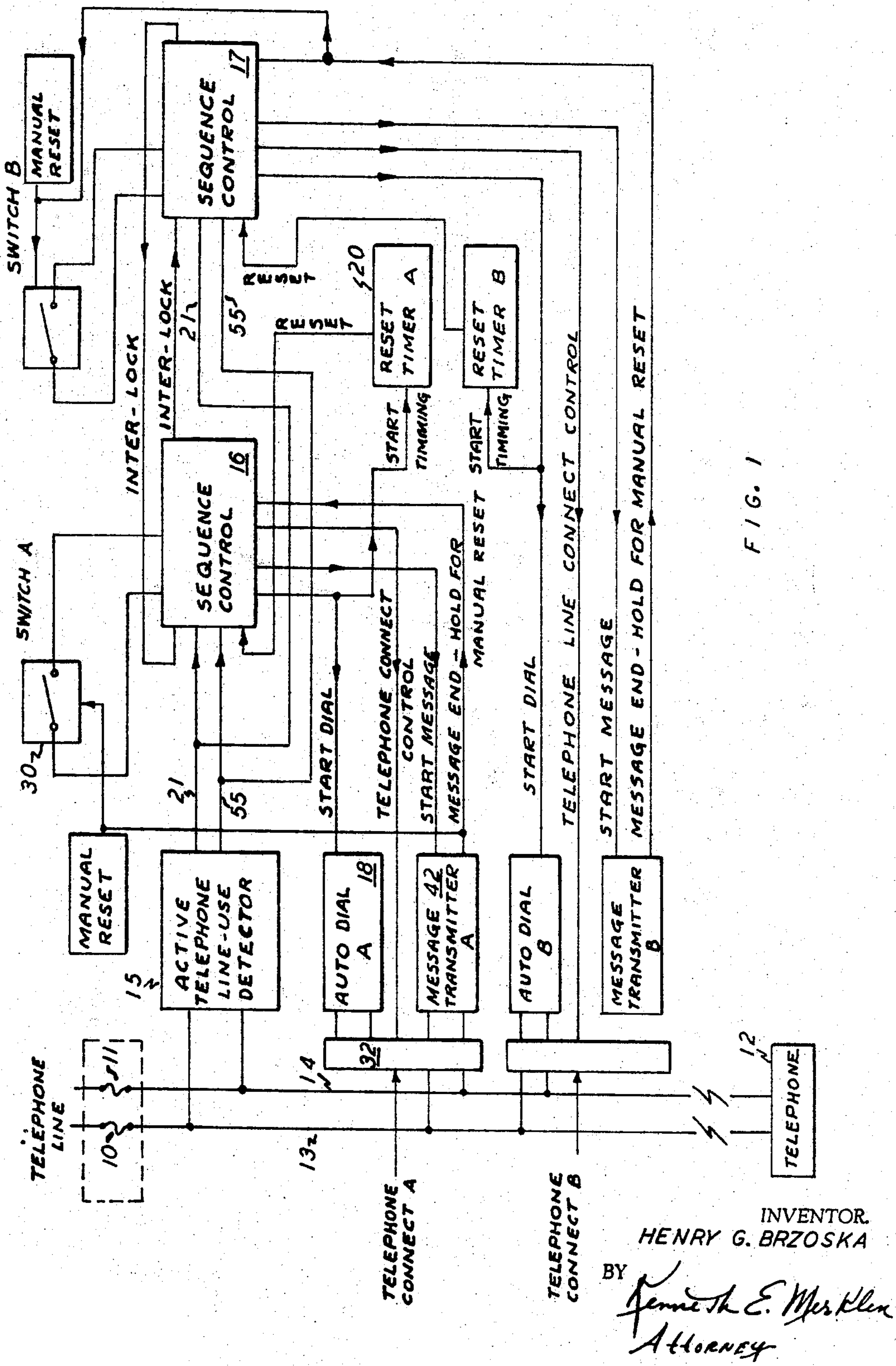
FIG. 1 is a functional block diagram of the present automatic alarm and message transmitting system for use on a telephone line.

Referring to FIG. 1, a functional block diagram of the present invention including two interlocked alarm/message transmitting units or systems, coupled to an active telephone line-use detector is represented which essentially represents a complex alarm/message transmitting system. As previously stated the system connects in parallel to the existing telephone lines between the central office or telephone exchange and a local telephone. For example, if the system were used in a home, the system may conveniently be connected to the telephone lines 13–14 between the telephone line fuse terminals 10, 11 and the telephone or telephones 12, in the house.

The Active Telephone Line-Use Detector 15 is connected to the lines 13 and 14 and serves, as a common component for each alarm/message unit, forming a complex system. The Active Telephone Line-Use Detector 15 may be a voltage sensitive circuit or device which senses the voltage level of the telephone lines, and provides signals in accordance with the voltage level.

It has been found that the voltage across the telephone lines, may vary according to the use made of the telephone. When the telephone or phone is not in use, approximately 48 volts may be across the telephone lines. When the phone, such as 12 is removed from its cradle without having a connection completed to another phone, the potential across lines 13 and 14 may drop to approximately 30 to 35 volts, according to the telephone system. When connection with an external phone is made, such as when a call is made and the called telephone is answered, the potential across lines 13 and 14 may drop to approximately 16 to 22 volts.

The voltage values above may vary somewhat from one telephone to another whether in the same telephone system or another telephone system. Although the potential differences between various stages of usage may change from one telephone to another, the potential change between the same stages of usage of the same telephone remains constant. Thus, the active telephone line-use detector may be adjusted for particular response to the particular voltage levels at the particular stage of usage of the particular telephone.

The common active telephone line-use detector provides signals to each alarm/message unit in the complex system and is shown connected to Sequence Control A, 16 of one unit and to Sequence Control B, 17 of a second unit. Although two alarm/message units are shown in one complex system obviously one may be used by merely eliminating one alarm/message unit. If only one alarm/message unit were included in a system then the interlock circuit between the two units may also be eliminated. On the other hand, more than two alarm/message units may be used in one complex system by merely duplicating the components of one such unit and extending the interlock circuit so as to control the more than two alarm/message units.

Figure 2:
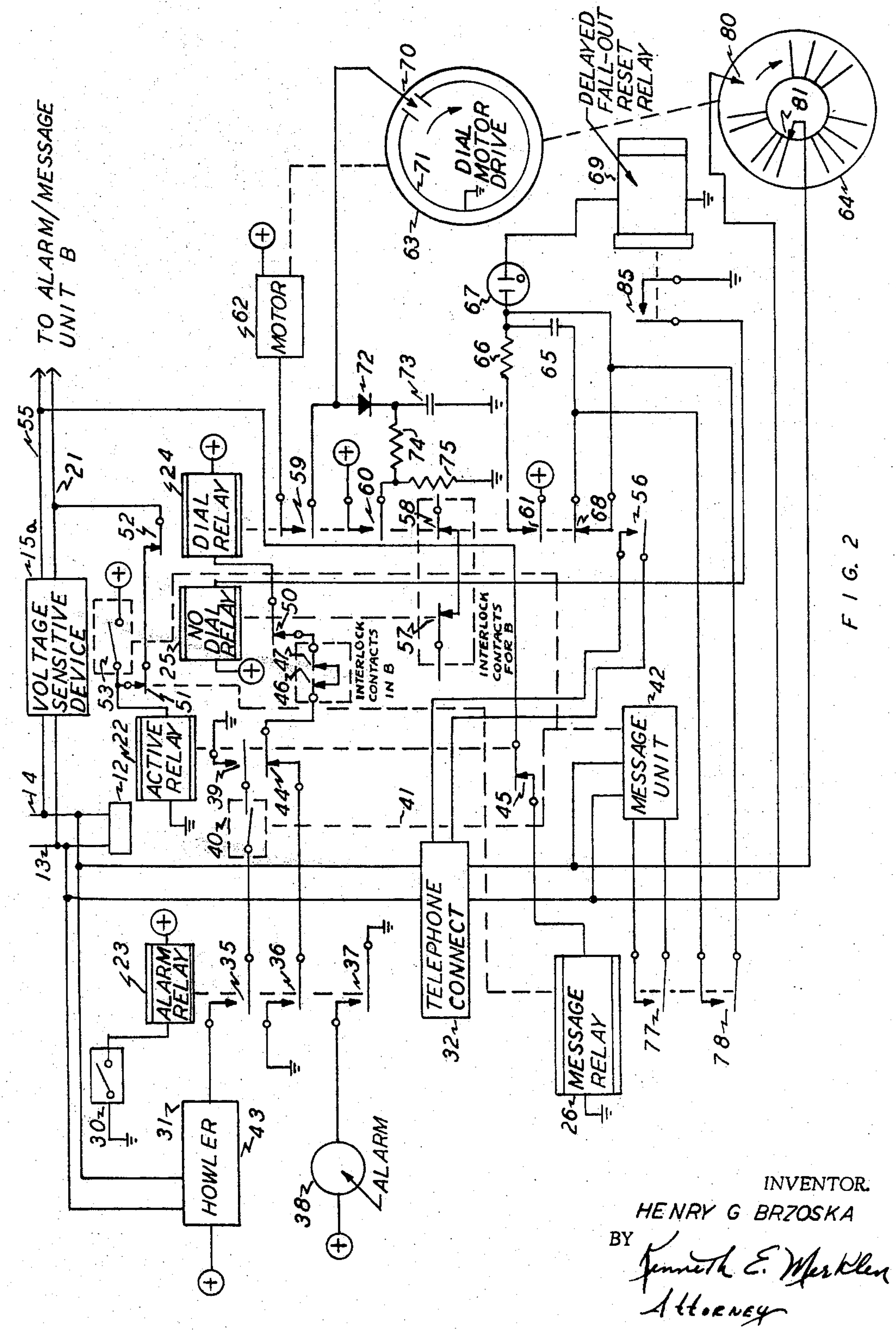
FIG. 2 is a schematic diagram of a preferred relay form of the present invention.

Functionally, the active telephone line-use detector provides a signal over lead 21, for example, which indicates when the telephone line is in use. As illustrated in FIG. 2 the lead 21 is an energizing lead for the Active Relay 22. Thus, when the telephone line is in use relay 22 will be energized. Relay 22 is assumed included as part of the sequence control units, although relay 22 is an active component. Also, included in the sequence control unit is an Alarm Relay, such as 23 in FIG. 2, a Dial Relay, such as 24, a No Dial Relay such as 25, and a Message Relay, such as 26. It will be obvious that the functions of these relays may be provided in solid state component circuitry, however for the purpose of this description the relay form is presented as the preferred arrangement, although solid state component circuitry providing the functional equivalent is included in the scope of this invention.

The Switch A 30 of FIG. 1, represents a detector or sensor which may be, for example, one or more actuatable devices which may close a set of normally open contacts when a hostile or unfriendly fire in the building is detected. The detectors or sensors may be located in the house, or any other building or out-structure in which it is desirable to detect an unfriendly fire. The detector may be in the form of a thermocouple device or may be any other device for detecting an unfriendly fire. An unfriendly or hostile fire is one which is not contained and used for heating, cooking or a particular controlled purpose.

The switch or detector 30 is presented as manually resettable since it is desirable to communicate only one message, upon actuation of the switch and also, in the case of an alarm/message unit which may respond to an unfriendly fire, to remain actuated until reset so as to maintain an audible alarm active so that a person or persons may be warned of the presence of the fire.

The relay or circuit logic in the sequence control unit 16 (as well as in 17) provides that the dial relay functions will be activated when the switch 30 is actuated and the telephone line 13–14 is not in use. If the alarm relay is activated by actuation of the detector or sensor 30, and the phone is then in use, the conditions of relays 22 and 23, indicating actuation of the detector and the phone being in use, combine to operate a Howler 31, seen in FIG. 2, which may indicate to the person using the telephone that something is wrong and it is expected that a normal person will return the telephone to its cradle, thereby returning the telephone line to an out-of-use stage or condition so that the alarm/message system may sequentially advance in its operation and complete its functions.

When an alarm/message transmission system includes two or more alarm/message units, an interlock between the sequence control units further prevents operation of an actuated alarm/message unit in the same system when another alarm/message unit which had previously been actuated is in its cycle of operation. Under these circumstances the alarm/message unit last to be actuated is held until the telephone line is no longer in use, and then permitted to sequentially advance in its cycle and carry out its function.

As seen in FIG. 1, the sequence control 16 controls the automatic dial 18, the message transmitter 42, and the interlock circuit between the alarm/message unit. The sequence control is controlled by the active telephone line-use detector, the actuatable detector (labeled Switch A for alarm/message unit A) and the interlock circuit (the interlock circuit when there are two or more alarm/message units in a system), and may be reset by the timer 20 to a condition that will cause the sequence control to re-cycle, starting at the connection establishing phase of the cycle.

When any alarm/message unit has completed its functions, that is, communicated a pre-recorded message to a person at the phone so dialed, the message transmitter holds the sequence control in a simulated non-actuated state. This prevents duplications of a cycle of operation, or any part thereof, thereby preventing the sending of two same messages in response to actuation of the same detector twice by the same occurrence or actuation of parallel detectors by the same occurrence and further prevents the sequence control of the cycled unit from preventing a companion sequence control, in the same system, from operating.

Manual reset is provided which resets all resettable components of the same alarm/message unit. In the case of a fire alarm/message unit, the audible alarm is maintained in operation although the message transmitter holds the sequence control from recycling. The reason for this is obvious.

It will be seen from FIGS. 1 and 2 that the automatic dial component and message transmitter are both connected to the internal telephone lines via the telephone connect component 32. When the alarm/message unit is in a quiescent state the telephone connect component is open-circuited so that there is no interference by the unit or system on the internal telephone lines.

Figures 3, 4:
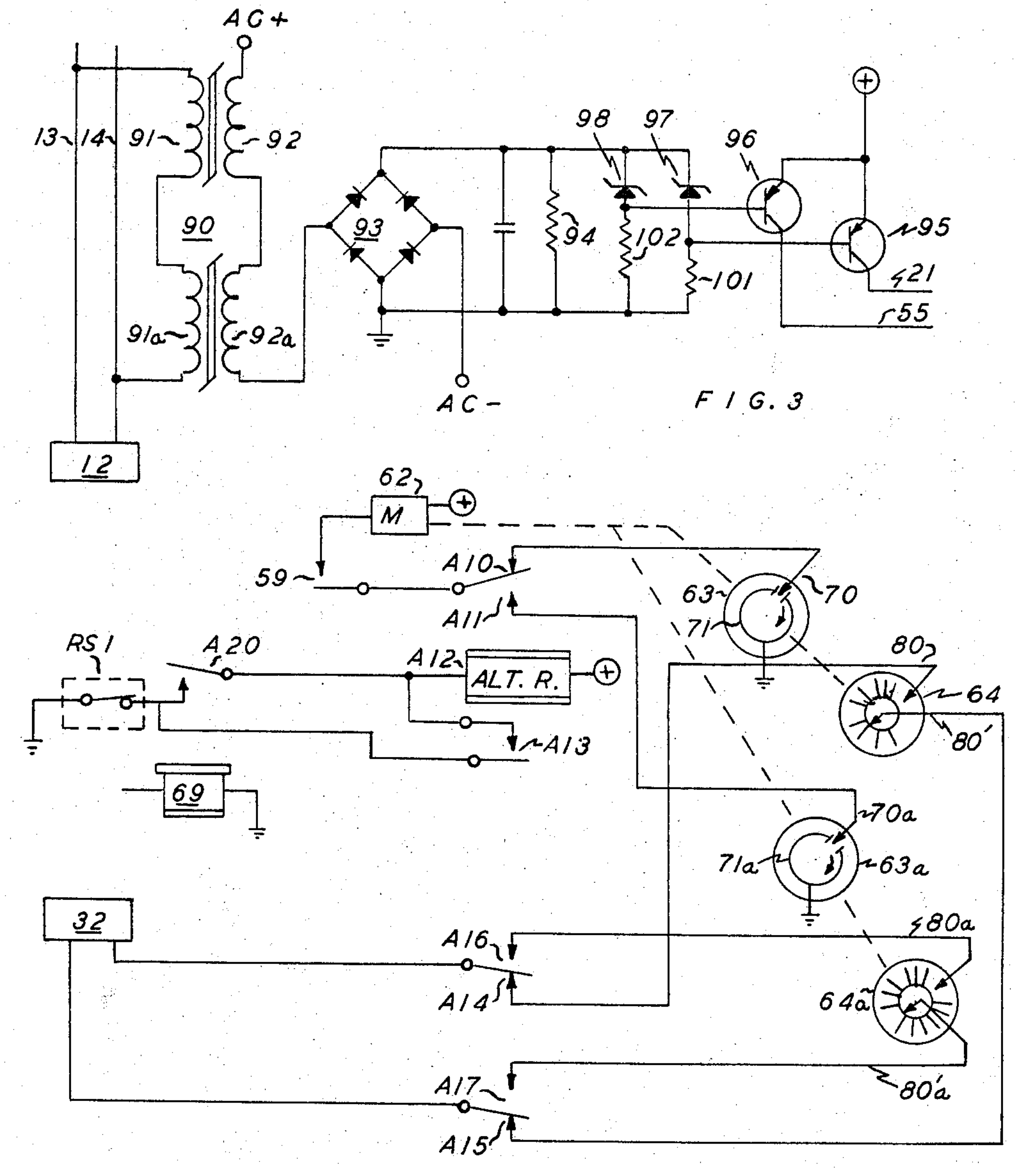
FIG. 3 is a schematic circuit diagram of one form of voltage sensitive circuit that may be helpful in understanding the present automatic alarm and message transmitting system.
FIG. 4 is a circuit arrangement of an alternate plural dial system for the present invention.

Referring to FIG. 2, a schematic diagram of an alarm/message system is illustrated with a block, labelled Voltage Sensitive Device 15*a*, representing the circuit seen in FIG. 3.

Let it be assumed that the alarm/message unit illustrated in FIG. 2 represents a fire alarm/message unit for a building such as a house. The switch 30 may then represent one detector or a plurality of detectors, one or more of which would be actuated in the case of a fire, the switch or switches 30 may be located in various out-of-the-way places among the various rooms of the house. Additional detectors would be connected, in parallel with switch 30, to the alarm relay 23.

In the preferred relay form, the alarm relay 23 is normally held de-energized. Upon closure of the normally open contacts of switch 30 alarm relay 23 will become energized. In a fire alarm/message unit the switch 30 would be a heat or temperature responsive device. Functionally the contacts of switch 30 would close when the ambient temperature would rise above a pre-determined temperature, which would be substantially higher than the temperature normally provided by a heating system. It is anticipated that such pre-determined temperature may be caused by the presence of an unfriendly fire. Upon energization relay 23 contacts 35, 36, and 37 become closed. Closure of contact 37 completes a circuit which operates the alarm 38, here assumed to be an audible alarm. The sounding of alarm 38 may indicate detection and/or presence of an unfriendly fire.

The switch 30 may represent any one of several different type of temperature sensitive or temperature responsive devices. One form of device which may be used, is a bi-metal strip which when normal temperature is increased becomes physically distorted due to the unequal expansion characteristics of the metals of the bi-metal strip. When the ambient temperature is increased so as to be at or exceed the pre-determined temperature the physical distortion of the bi-metal strip causes closure of a set of contacts which are normally open. These contacts may be part of an actuation circuit which includes the alarm relay 23.

The active relay 22 essentially responds to the use or non-use of the interval telephone line as detected by the voltage sensitive device 15*a*, when the alarm/message unit has not started its cycle of operation.

Normally, when a telephone line is not in use the potential across the lines 13, 14 may approximate 45 to 48 volts. The values of 45 to 48 volts vary from one telephone system to another but it will be found that when the telephone line is not in use the potential across lines such as 13 and 14 is the highest voltage normally on such lines.

A voltage sensitive device, such as 15*a* which is coupled to the lines 13 and 14, provides a relay energizing potential on line 21 when the voltage across lines 13 and 14 drops below the normal high value by a pre-determined number of volts.

Thus, when the voltage on line 13 and 14 is at a normal high value there is no output on either leads 21 or 55, as seen in FIG. 3. When leads 21 and/or 55 are essentially de-energized and the alarm/message unit is not in its cycle of operation, the relay 22 is held de-energized.

The voltage drop from a normal high value, at which the relay 22 may be energized also depends upon the telephone system. It has been found normal for the potential across the lines 13 and 14 to drop from a normal high voltage (for example 48 volts) some 10 to 12 volts when the telephone 12 is removed from its cradle. Thus, depending upon the characteristics of the telephone system a voltage differential of 10 volts may be used as a value during which relay 22 is held de-energized.

Assume the present telephone lines to have a normal high voltage potential of 48 volts, indicating non-use. Assume further that when the telephone is removed from its cradle, the potential across lines 13, 14 normally drops to approximately 36 volts. In such event the threshold voltage value at which an energizing potential is applied to line 21 may be 38 to 39 volts for example.

Thus, the active relay 22 then may reflect use or non-use of the telephone line according to the condition, of the relay, that is, energized or non-energized, respectively.

The line 21 may be extended to other alarm/message units when two or more units are employed in a single alarm/message system, such line being extended to an active relay comparable to relay 22, in the companion unit, with similar circuitry.

The Active Relay 22 controls normally open contact 39 which is in series with normally open contact 35 the latter contact being controlled by Alarm Relay 23. Also in the same series circuit is switch 40, which is normally closed. The switch 40 is controlled by the message unit 42 as indicated by broken line 41. Switch 40 shall be more fully discussed below.

When alarm relay 23 is energized, indicating the detector or sensor switch has been actuated, and active relay 22 is energized, indicating the telephone line is in use (assuming switch 40 to be closed) a circuit is completed to activate the Howler 43. The Howler 43 is coupled to the telephone lines 13, 14 and, when activated provides an audible noise which is heard in the receiver of the telephone. This is intended to inform the person using the telephone to return the telephone to its cradle because the alarm system has been actuated.

Active relay 22 also controls the normally closed contacts 44 and 45. Contact 44 is in series with alarm relay contact 36 and the interlock contacts 46 and 47 and contact 50 of the No Dial Relay 25, which combine to form a series circuit for controlling the Dial Relay 24.

When the alarm relay is energized (indicative of actuation of switch 30) normally open contact 36 is closed; when the active relay is de-energized (indicating the telephone is not in use) normally closed contact 44 is closed; when the no dial relay 25 is de-energized (no dial relay 25 is energized only upon partial recycling of the alarm unit) normally closed contact 50 is closed, and when the companion alarm/message unit or units in the system are not cycling, the interlock contacts are closed thus, completing the energizing circuit for Dial Relay 24.

Normally closed contact 45 is also controlled by the active relay which contact is located in the energizing circuit for the Message Relay 26. With the active relay energized, contact 45 is opened thereby preventing energization of the message relay 26.

It will be seen that the energizing circuit for active relay 22 includes the normally closed series contacts 51 and 52. An auxiliary power source is provided through switch 53, which switch is normally open.

In order that the dialing process be accomplished the alarm/message unit must be electrically connected into the telephone line. This is accomplished by the telephone connect unit 32 which is activated by closure of contact 56 by energization of relay 24. When dial relay 24 becomes energized contact 52 is opened thereby preventing active relay 22 from becoming energized when the dial unit is electrically connected to the telephone lines 13, 14. Obviously when the dial unit is connected electrically to the telephone lines the voltage across lines 13 and 14 will drop, and unless otherwise prevented, active relay 22 would become energized and interrupt operation of the alarm/message unit.

The message relay 26 is coupled to line 55 which is a line providing an output of the voltage sensitive device when the voltage across the lines 13, 14 has reached its low value, indicating the connection to the telephone whose number was dialed has been made or, in other words, the phone on the other end has been answered. In accordance with the assumed voltage values, a normal high value of 48 volts appears across line 13 and 14 when the telephone is not in use. When the telephone is removed from its cradle, or the dialing device is electrically connected to the telephone lines, through the telephone connect circuit 32, the potential across the lines 13, 14 drops, as assumed, some 10 volts. When the phone at the "called" number is lifted off its cradle, or in other words, when the phone called is answered, another voltage drop occurs across the lines 13, 14. This latter potential drop across lines 13, 14 may be of the order of another 10 to 12 volts so that the voltage across lines 13, 14 during an active phone conversation may be of the order of some 28 volts, for example.

Thus, the line 55 may provide an output for energizing message relay 26 when the potential across lines 13, 14 is at or below 30 volts, for example. Closer threshold voltage values, other than the values mentioned herein, may be used, if desired. It becomes obvious that dialing is accomplished only if the telephone is not otherwise in use and that a message is transmitted only when the number called is answered.

The lead 55 may also be extended to a companion alarm/message unit or units which may be included in common system and lead 55 would be connected similar circuitry in the companion unit or units as shown in FIG. 2.

It was mentioned that the switches 40 and 53 are controlled by the message unit 42. Since the object of the alarm/message unit is to communicate a message to the phone so dialed by the device, when the message has been communicated the primary function of the alarm/message unit is deemed completed. Thus, when the message has been communicated the message unit, terminates itself and in so doing, also opens switch 40 to prevent actuation of the Howler 43 and also closes switch 53 which completes a circuit for supplying an auxiliary source of power to energize the active relay 22. As presented, the message unit is manually reset so that essentially the switches 40 and 53 are manually reset. In addition, the actuatable switch 30 is also manually reset so that the alarm relay 23 will be maintained energized until the switch 30 is reset. This appears desirable since it is preferred to maintain the alarm 38 sounding even though the alarm/message unit has completed communication of its message. However, it is necessary to de-activate or isolate the alarm/message unit which has finished its cycle, and its primary function, from the internal telephone lines and prevent this unit from preventing other companion units in the system from operating and completing their own cycle if the actuable switch (comparable to switch 30) of the companion unit is actuated. Thus, the message unit 42 serves two separate functions; one, to communicate a pre-recorded message to a person on the phone so dialed and, two, to deactivate the alarm/message unit and prevent interference with the operation or cycle of a companion unit, in the same system. Interference with the operation or cycle of a companion unit is controlled by the interlock contacts 57 and 58. These contacts are labeled "Interlock Contacts For B" and are surrounded by a broken line box to indicate that these contacts are in the dial relay energizing circuit for a companion unit. The interlock contacts 46 and 47 (affecting the alarm/message unit shown), labeled "Interlock Contacts In B" are assumed to be remotely located in the alarm/message unit B and are controlled by relays in unit B which corresponds to the No Dial Relay 25 and the Dial Relay 24 in unit A. Unit A is assumed to be the unit shown in FIG. 2.

If only one alarm/message unit is included in a system the interlock contacts would be eliminated.

As previously defined, the cycle of operation of the alarm/message unit will start only when conditions on the telephone line are favorable, and the detector or actuable switch (such as 30) has been actuated and a companion unit is not cycling.

Energization of the Dial Relay serves to actively initiate the cycle of operation, and open an interlock contact 58, so as to prevent operation of any companion unit in the same system. Contact 58 is opened upon energization of dial relay 24 so as to maintain the energizing circuit for the dial relay in a companion unit, open. Energization of dial relay 24 closes normally open contacts 56, 59, 60, and 61, and opens normally closed contact 68. Closure of contact 56 completes the telephone connection by closure of a normally open circuit represented by block 32, Telephone Connect. The telephone connect circuit connects both the dial unit and the message unit to the lines 13, 14 and make both dialing and message transmission possible.

Closure of contact 59 completes a power circuit for operating motor 62. Motor 62 serves to drive the dial motor drive or disc 63 and the printed circuit dial or disc, component 64.

Closure of contact 61 completes a charging circuit for charging timing condenser 65 through timing resistor 66 since contact 68 (which, when closed shunts condenser 65) is opened by energization of dial relay 24.

Tube 67 represents a flash tube which when condenser 65 is charged to the break-down potential of tube 67 passes current to energize Delayed Fall-out Reset Relay 69. The function of this timing circuit in conjunction with the reset relay 69 will be discussed later. However, the timed interval between closure of contact 61 (and opening of contact 68) and pull-in or energization of reset relay 69 depends on the R-C time constant of resistor 66 and capacitor 65, the value of the charging source and the breakdown voltage of the tube 67.

The line and arrow 70 represent a brush which contacts the split ring conductor 71 on the face of the motor drive disc 63. As illustrated the brush 70 is normally isolated from the split ring conductor 71. While contact 60 is open any charge which may be on capacitor 73 bleeds off through the high resistance combination of resistors 74 and 75, which shunt capacitor 73.

Upon closure of contact 59 a motor driving circuit is completed from the power source, represented by a plus in a circle, through contact 59 and diode 72 to capacitor 73, the circuit completed to ground. Capacitor 73 is of sufficient size so that during the charging, the motor 62 is driven so as to rotate the disc 63 and 64 to a position where brush 70 makes contact with conductor 71. Although contact 60 is closed the resistor 74 is sufficiently high so that the power applied through contact 60 and resistor 74 is greatly reduced from the power applied through diode 72. When brush 70 contacts the split ring conductor 71 the primary circuit for driving motor 62 is completed. During closure of contact 60 capacitor 73 becomes charged from the source of power applied via contact 60.

When the motor drives the disc 63 and 64 (disc 64 being essentially coupled to disc 63) a pulsing effect is provided to the telephone lines 13, 14 via the telephone connect circuit 32, which serves to provide a dialing effect. When the disc 63 is rotated so that the brush 70 again is isolated from the ground conductor 71 the dialing will be completed. Since the capacitor 73 will be fully charged the starting circuit will be essentially blocked and the motor will stop.

As will be more fully described with reference to rest, the interval timed by the timing circuit exceeds the time required to rotate disc 63 (and 64) so as to permit a reasonable time after dialing has been completed, for the phone so dialed to be answered.

The disc 64 represents one form of dialing device, although other dialing devices may be employed. Another form may be found in U.S. Patents 3,194,888, or 3,189,-692, for example. Brush 80 makes contact with the segments which complete a circuit through the concentric ring and brush 81 so that dial pulses are simulated and passed to the telephone connection circuit via block 32 and to the lines 13, 14. On a phone without a dial, the dial unit may be eliminated and a pre-recorded message unit could be substituted for the dial unit. This also may eliminate the message unit of message relay 26, the energizing circuit including line 55 and the message unit 42. Such modification is believed to be obvious. Substitution of a message unit for the dial unit for a phone system without a dial is possible since the dial unit is repeatable, as will be described below.

Assuming now that the phone so dialed is answered, the potential across lines 13, 14 further drops so as to provide an energizing potential applied via line 55 and closed contact 45 to message relay 26.

Upon energization the message relay 26 closes its normally open contacts 77 and 78. Closure of contact 77 actuates the message unit 42 which reads out the pre-recorded message into the telephone lines 13, 14 via the telephone connect circuit 32. The message unit may, for example, be in the form of a tape recorder having a pre-recorded tape, motor drive and playback head. The message may include information such as that required to report a fire to a fire department, a message to the police or another message to a service or maintenance individual or personnel.

Closure of contact 78 provides a shunting circuit for timing condenser 65 which essentially discharges condenser 65 and stops timing of the interval.

Message relay 26 also opens contact 51 in the energizing circuit of active relay 22 to assure that active relay 22 is held de-energizing.

When the message on the message unit 42 is completed, the switch 40 is opened thereby preventing the howler 43 from being further operated. Switch 53 is closed so as to energize the active relay 22. Switches 40 and 53, as previously mentioned are presented as manually resettable. These are presented in this manner to avoid repetition of the same message for the same occurrence.

Upon energization, active relay 22 closes contact 39 but switch 40, now open prevents operation of the howler 43. Contact 44 is opened by energization of relay 22, thereby opening the energizing circuit for dial relay 24, thus de-energizing the dial relay. Contact 45 is also opened thus causing de-energization of the message relay 26. It is assumed that closure and opening of the switches 53 and 40 respectively is maintained until the message unit 42 is manually reset. Such switches may be microswitches or other type of two position switches which may be reversed from their normal condition of 40 being closed and 53 being open upon termination of operation of the message unit.

Upon de-energization of the dial relay 24, contact 59 opens to interrupt the potential driving circuit for motor 62; contact 60 opens to interrupt the charging circuit of capacitor 73 and the charge on capacitor 73 bleeds off through resistors 74 and 75; contact 61 opens to interrupt the charging of timing condenser 65; contact 56 opens to break the telephone connection made at 32 and, contact 68 closes to shunt timing condenser 65 thereby discharging any charge that may be on the condenser.

With message relay 26 de-energized by the opening of contact 45, contacts 77 and 78 are both opened thereby removing the driving power from the message unit 42 and opening the parallel shunting circuit for timing condenser 65.

Thus, with the cycle of operation completed, the active relay 22 is held energized to simulate that the lines 13 and 14 are in a state or condition of use by a local phone. This is assumed to be the telephone on the lines 13 and 14.

The timing circuit, Delayed Fall-out Reset Relay and No Dial Relay combine to provide a partial re-cycling of the alarm/message unit so as to accord a means of re-dialing, in the event that the telephone dialed is busy or does not answer, within a preset time period.

Since the number to be dialed is any number desirable, such as the police, fire department, doctor, hospital, repair, or service personnel or any other desired number, it may be that the phone called is either busy or unattended. Obviously, the disc 64 may be made to dial any preset number and the message on the message unit may be used to communicate any pre-recorded message. In some cases, such as a call to the police or the fire department it is expected that the phone called will be attended and answered promptly. In some cases the phone called may be busy. In order to insure contact with the telephone called, a timing circuit which operates a reset means is provided. The time constant and other parameters of the timing circuit may be selected so that the interval times exceeds the time required for completing the dialing of the telephone number so dialed, plus a reasonable amount of time for the phone called to be answered.

Let it be assumed that complete rotation of the dialing disc 64 (also motor drive disc 63) is completed in some 15 seconds, for example. Further let it be assumed that a time period of some 30 seconds be allowed for the phone on the other end to be answered, after the dialing is completed. Then the parameters of the timing circuit may be selected so as to time an interval of 45 seconds, for example.

It was mentioned that the timing of the interval so timed and rotation of the dialing disc by the motor 62 start substantially simultaneously.

After the dialing is completed some 30 seconds then remains before the interval so timed is terminated.

If the phone called is not answered prior to completion of the timed interval (30 seconds after dialing) the tube 67 will pass an energizing current and energize delayed fall-out reset relay 69. Reset relay 69 will pull-in and close its contact 85 which completes an energizing circuit for No Dial Relay 25. With no dial relay 25 energized contact 50 is opened which opens the energizing circuit for dial relay 24 thereby de-energizing relay 24. De-energization of relay 24 opens the contacts 59, 60, 61, and 56 and closes contact 58 and 68. Thus, the driving circuit for motor 62 is opened; the charging circuit for capacitor 73 is opened and capacitor 73 begins to discharge through resistors 74 and 75; the charging circuit for timing condenser 65 is opened; the discharge circuit for time condenser 65 is completed, via contact 68 and, the telephone connection made by the telephone connect circuit block 32 is opened. Since the timing circuit has been disabled and the time capacitor 65 has been discharged, this de-energizes reset relay 69, however reset relay 69 is a delayed fall-out relay which holds contact 85 closed for an interval of time sufficient to permit capacitor 63 to discharge.

No Dial Relay 25 also opens interlock contact 57, for holding alarm/message unit B, since interlock contact 58 is closed. Thus, the alarm/message unit A is returned to a condition where the cycle of operation is started over again. After the delayed fall-out time of reset relay 69 expires, contact 85 is released and opens thereby de-energizing No Dial Relay 25. Contact 50 is released and closes thus, closing the energizing circuit for Dial Relay 24.

When the No Dial Delay 25 pulls in (energized), causing contact 50 to open and drop out (de-energize) the Dial Relay 24 contact 52 of the Dial Relay was released and closed. This permitted the active relay 22 to respond to the output of the voltage sensitive device 15a. If the telephone 12 was put in a state use during the reset period, the active relay 22 would pull-in and provide functions previously described. If, on the other hand the telephone 12 remained out of use during the reset period then the Dial Relay 24 would pull in upon closure of contact 50 and the cycle of operation, starting with initiation of the dialing phase, will commence.

Reset and re-cycling of the unit will continue if the phone dialed is not answered within the time period so timed by the timing circuit. This reset for re-cycling will continue in the arrangement of FIG. 2 until the phone called is answered.

This finds great utility when the phone at the number called is busy or unattended. FIG. 4 illustrates a method and circuitry for providing a series of telephone numbers.

It was previously mentioned that the alarm-message unit may be in solid state, logic form.

As is well known in the art, AND logic, OR logic and other logic circuits may be combined to provide the relay logic functions described. The state of the art is believed to be such that a solid state form of the described relay form is a matter design. The relay form, which has been disclosed has been found to be successful.

Where direct current power is required, such as in the timing circuit and the motor drive circuit, either batteries or a rectified alternating current may be provided.

Referring to FIG. 3, one form of voltage sensitive circuit is illustrated which may be represented by the block 15a of FIG. 2.

The block 12 represents a telephone and the leads 13 and 14, represent the telephone lines, as in FIGS. 1 and 2.

The leads 21 and 55 correspond to similarly labeled leads in FIGS. 1 and 2. It is assumed that the leads 21 and 55 extend to alarm/message units in the system and, in particular, extend to the relay of which the respective line is a part of the energizing circuit. These circuits are clearly shown in FIG. 2 and have been described.

The voltage across leads 13 and 14 is applied to the coils 91 and 91a of a saturable reactor 90. An alternating current (AC) source is applied through the coils 92 and 92a and through a bridge rectifier 93, to the AC return.

The characteristics of the saturable reactor 90 are assumed to be such that when the voltage across leads 13 and 14 (and thus, the voltage applied through coils 91 and 91a) is relatively high, for example 48 volts, passage of the AC through coils 92 and 92a is substantially blocked. Thus, the amount of rectified current across the resistor 94 is negligible, and in fact, insufficient to drive transistor 95 or 96 to conduction.

Further, in order to drive either transistor 95 or 96 to conduction the voltage across resistor 94 must at least exceed the breakdown voltage of the Zener diode 97 (for transistor 95) or Zener diode 98 (transistor 96).

The values of the components of the circuit may be selected according to the voltage values obtained across the leads 13 and 14 depending upon the stage of use of the telephone. The Zener diodes may be selected according to the voltage expected across resistor 94, the voltage necessary to drive the transistor (95 or 96) to conduction and the breakdown voltage of the diode. Thus, if 38 volts across 13 and 14 (coils 91 and 91a) will provide a voltage of 7 volts across resistor 94 and 5 volts will drive transistor 95 to full conduction, then Zener diode 97 may have a breakdown voltage of 2 volts. If 28 volts across 13 and 14 provides a voltage of 17 volts across resistor 95 and 5 volts will drive transistor 96 to full conduction, then Zener diode 98 may have a breakdown voltage of 12 volts.

When the telephone 12 is not in use, the voltage across leads 13 and 14 (and applied to the coils 91 and 91*a*) is, as assumed, 48 volts. This is assumed to be sufficient to substantially block passage of the AC through the coils 92 and 92*a*. Under such conditions there will be no current passed through the bridge rectifier 93 and therefore, no voltage across resistor 94. Thus, both transistors 95 and 96 will be non-conducting.

In order to ensure that transistors 95 and 96 remain in a non-conducting condition Zener diodes 97 and 98 form a part of the base biasing circuit for the respective transistor.

Assume now that diode 97 has a breakdown value of 2 volts and diode 98 has a breakdown value of 12 volts. Now, if the telephone 12 is removed from its cradle, in preparation to make a call, or the dial mechanism of an alarm/message unit is connected across leads 13 and 14, the voltage across leads 13 and 14 drops to substantially 38 volts.

With 38 volts applied across coils 91 and 91*a* sufficient AC is permitted to pass through coils 92 and 92*a* so that a rectified voltage of substantially 7 volts, for example appears across resistor 94. The 7 volts is also applied to the biasing circuit of diode 97 and resistor 101. Since diode 97 has a breakdown voltage of 2 volts then 5 volts appears across resistor 101 and the 5 volts are applied to the base of transistor 95. The 5 volts are assumed to be sufficient to drive transistor 95 to full conduction. Thus, lead 21, which essentially forms the collector circuit of transistor 95, becomes energized. However, since diode 98 has a breakdown voltage of 12 volts, no voltage appears across the biasing circuit including diode 98 and resistor 102 thus, transistor diode 96 remains non-conducting.

Assume now that the telephone called is answered and that the voltage across leads 13 and 14 drops to substantially 28 volts. With the additional reduction in voltage across coils 91 and 91*a* the AC passing through coils 92 and 92*a* increases so that the rectified voltage across resistor 94 increases to, for example, 17 volts. With 17 volts across resistor 94 the transistor 95 is held conducting. In addition, since diode 98 has a breakdown voltage of 12 volts, some 5 volts appears across resistor 102 and is applied to the base of transistor 96. Thus, transistor 96 is driven to conduction and lead 55 essentially becomes energized.

Other forms and/or circuits which are voltage sensitive or threshold circuits may be used, I have shown one.

My invention includes an arrangement whereby an alternate telephone number may be dialed in the event the first telephone number dialed has no response, within a pre-determined time.

FIG. 4 illustrates circuitry for selecting an alternate dial mechanism for dialing an alternate telephone number.

In this arrangement the motor 62 may drive two or more dial discs. As shown the disc 63 and 63*a* are driven by the motor 62. In normal operation, that is for the first number dialed the motor 62 would have its ground supply through contact A10 of relay A12, the Alternate Relay. As seen the ground connection is made through the brush 70 in contact with the split ring 71 on the disc 63.

The pulses for the dial operation would pass through the normally closed contact A14 from the brush 80 to the telephone connect circuit 32 with a ground return via contact A15 to the brush 80′, connected to the ground ring.

In the event that the number dialed fails to answer, within the time set and timed by the timing circuit the relay 69 will become energized. Relay 69 will close its contact A20 which will complete an energizing circuit for the relay A12, the Alternate (dial) Relay.

Upon energization relay A12 will close its locking contacts A13 which will hold the relay energized until a manual reset switch RS1 is opened.

Also, upon energization contacts A10, A14, and A15 are opened and contacts A11, A16, and A17 are closed. Closure of contact A11 supplies a ground connected for motor 62 through brush 70*a* of disc 63*a* on ground ring 71*a*. Closure of contacts A16 and A17 couple the rotary pulsing mechanism from brush 64*a* and brush 80′*a* to the telephone connect circuit, here assumed to be closed.

It is anticipated that more than two dialing mechanisms could be systematically selected if the number dialed fails to answer.

A further alternative includes a solenoid substituted for the relay A12 (Alternate Relay) and the contacts may be banks of a stepping switch. Thus, a plurality of telephone dial mechanisms with different telephone numbers may be selected in sequence, on a step-by-step basis until a telephone that is dialed answers within the time period of the timing circuits.

This last arrangement may not be too practical for a call to the fire department or police department but in the case of a repairman or some maintenance personnel such arrangement has great utility.

It is obvious that the utility of my invention exceeds the uses mentioned. Service personnel and/or maintenance personnel may be called when a monitored device or unit may fail or otherwise function in an undesirable manner. An example may be the failure in a "life" test which continues until a failure is obtained and then a call is made to one or another or a series of selected personnel.

Thus, I have provided my automatic alarm/message system with several alternates and many functional uses. I am aware that several ways of dialing a telephone number may be used, however, this is an intermediate function of the entire operation of the present invention. Although I have shown the preferred arrangement and have suggested other arrangements additional arrangements may be made as will be familiar to those skilled in the art, without departing from the spirit of the invention as defined in the appended claims.

What I claim is:

1. An alarm and message communicating system for automatically communicating a message from a plurality of messages by telephone to a telephone selected from a plurality of predetermined telephones in response to occurrence of an event selected from a plurality of predetermined events including, telephone use sensing means coupled to the telephone lines for determining the condition of use of said telephone lines and for providing a first indication when the telephone is not in use, a second indication when a call is being made but the telephone called has not answered and a third indication when a telephone call is being made and the telephone called has answered, means for sensing the occurrence of a first predetermined event and for providing a first signal upon such occurrence, means for sensing the occurrence, of a second predetermined event and for providing a second signal upon such occurrence, first dial means for dialing a first predetermined telephone number, second dial means for dialing a second predetermined telephone number, first telephone connect means for coupling said first dial means to said telephone lines upon concurrent occurrence of said first indication and said first signal, second telephone connect means for coupling said second dial means to said telephone lines upon concurrent occurrence of said first indication and said second signal, first message transmitting means for transmitting a predetermined message over the said telephone lines in response to occurrence of said third indication after concurrent occurrence of said first indication and said first signal, second message transmitting means for transmitting another predetermined message over the said telephone lines in response to occurrence of said third indication after concurrent occurrence of said first indication and said second signal, and means responsive to concurrent occurrence of said first indication and said first signal for simulating said second indication to said second telephone connect means until termination of transmission of said first message.

2. An alarm and message communicating system as in claim 1 and further including;

second means responsive to concurrent occurrence of said first indication and said second signal for simulating said second indication to said first telephone connect means until termination of transmission of said second message.

3. An alarm and message communicating system as in claim 1 and further including;

alarm means responsive to occurrence of said first signal for indicating occurrence of said first predetermined event.

4. An alarm and message communicating system as in claim 1 and further including;

alarm means responsive to occurrence of said second signal for indicating occurrence of said second predetermined event.

5. An alarm and message communicating system for automatically communicating a message by telephone to a pre-determined telephone in response to the occurrence of a pre-determined event including;

means responsive to occurrence of said pre-determined event for providing a first signal upon occurrence of said event, voltage level responsive means coupled across the telephone lines for providing a second signal when the voltage level across the telephone lines is at least above a pre-determined voltage level, and for providing a third signal when the voltage level across the telephone lines is at least below a second predetermined voltage level, and for providing a fourth signal when the voltage level across the telephone lines is at least below a third predetermined voltage level, alarm means responsive to the occurrence of said first signal, howler means coupled to said telephone lines in response to concurrent occurrence of said first signal and said third signal, dial means for dialing a pre-determined telephone number when initiated, means for coupling said dial means to said telephone lines in response to concurrent occurrence of said first signal and said second signal, means for initiating dialing by said dial means in response to concurrent occurrence of said first signal and said second signal, mesage means for transmitting a pre-recorded message over the telephone lines in response to occurrence of said fourth signal after concurrent occurrence of said first and second signals, and means for simulating said third signal in response to termination of the transmitted message.

6. An alarm and message communicating system for automatically communicating a message by telephone to a pre-determined telephone in response to the occurrence of a pre-determined event including;

means for detecting the occurrence of a predetermined event and for providing a detection signal in response thereto, means for determining the state of usage of the telephone lines over which the message is to be transmitted and for providing a first signal when the telephone is out of use and a second signal when the telephone is in use and lacks a completed connection and a third signal when the telephone is in use and a complete connection has been made, first dial means for dialing a first pre-determined telephone number upon initiation thereof;

second dial means for dialing a second pre-determined telephone number upon initiation thereof, coupling means for selectively coupling said first dial means to said telephone lines upon coincidence of said detection signal and said first signal, means for initiating said first dial means for dialing said first telephone number in response to coincidence of said detection signal and said first signal, means for timing a predetermined time interval commencing with initiation of said first dial means so dialing, means responsive to termination of said timed interval prior to occurrence of said third signal for uncoupling said first dial means from said telephone lines and for coupling said second dial means to said telephone lines and for initiating dialing of said second dial means for dialing said second telephone number, and means responsive to occurrence of said third signal after coincidence of said detection signal and said first signal for transmitting a message over the telephone lines.

References Cited

UNITED STATES PATENTS

| | | | |
|---|---|---|---|
| 2,228,673 | 1/1941 | Reeves | 179—2 |
| 2,555,714 | 6/1951 | Talbot | 179 |
| 2,827,515 | 3/1958 | Zuber | 179 |

ROBERT L. GRIFFIN, *Primary Examiner.*

J. T. STRATMAN, *Assistant Examiner.*